(12) United States Patent
Kurose (10) Patent No.: US 6,441,818 B1
(45) Date of Patent: Aug. 27, 2002

(54) IMAGE PROCESSING APPARATUS AND METHOD OF SAME

(75) Inventor: Yoshikazu Kurose, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/498,533

(22) Filed: Feb. 4, 2000

(30) Foreign Application Priority Data

Feb. 5, 1999 (JP) .......................................... 11-029020

(51) Int. Cl.[7] .............................................. G06T 15/00
(52) U.S. Cl. ....................................................... 345/422
(58) Field of Search ................................. 345/419, 422, 345/428, 601, 629; 365/189.01, 230.01

(56) References Cited

U.S. PATENT DOCUMENTS 5,430,465 A * 7/1995 Sabella et al. ............... 345/199
5,864,512 A * 1/1999 Buckelew ................ 365/230.01
6,285,371 B1 * 9/2001 Gould et al. ................. 345/422

* cited by examiner

*Primary Examiner*—Almis R. Jankus
(74) *Attorney, Agent, or Firm*—Fulwider Patton Lee & Utecht, LLP

(57) ABSTRACT

An image processing apparatus which can perform a variety of graphic processing using a video signal obtained by an image pickup apparatus. A system comprising a DDA set-up circuit for generating first image data and first z-data, a triangle circuit, a texture engine circuit, and a memory I/F circuit for writing the first image data and the first z-data respectively in a display buffer memory and a x-buffer memory and for writing the second image data and the second z-data respectively to the display buffer memory and the z-buffer memory when second image data corresponding to image pickup results of an image pickup apparatus and second x-data corresponding to the second image data are input from the video signal generator.

19 Claims, 10 Drawing Sheets

IMAGE PROCESSING APPARATUS AND METHOD OF SAME

BACKGROUND OF THE INVENTION

1. Field of the Invention

The present invention relates to an image processing apparatus capable of performing graphic processing such as hidden plane processing on a video signal obtained from a video camera or the like.

2. Description of the Related Art

Computer graphics are often used in a variety of computer aided design (CAD) systems and amusement machines. Especially, along with the recent advances in image processing techniques, systems using three-dimensional computer graphics are becoming rapidly widespread.

In three-dimensional computer graphics, the color value of each pixel is calculated at the time of deciding the color of each corresponding pixel. Then, rendering is performed for writing the calculated value to an address of a display buffer (frame buffer) corresponding to the pixel.

One of the rendering methods is polygon rendering. In this method, a three-dimensional model is expressed as an composite of triangular unit graphics (polygons). By drawing the polygons as units, the colors of the pixels of the display screen are decided.

Also, in the three-dimensional computer graphics, hidden plane processing using a z-buffer memory is performed.

Namely, when composing a first image data (color data) already stored in a display buffer memory and a second image data subjected to graphic processing, it is judged whether or not an image corresponding to the second image data is positioned closer to the viewing point than an image corresponding to the first image data by comparing first z-data stored in the z-buffer memory and second z-data corresponding to the second image data. Then, when it is judged that it is positioned closer, the first z-data stored in the z-buffer memory is updated by the second z-data, and the first image data stored in a display buffer memory is updated by the second image data.

Then, the image data is read from the display buffer memory and output to a display such as a CRT (cathode ray tube).

There has been a demand to performing processing by using a three-dimensional computer graphic system on a video signal obtained by taking a picture of a natural image by an image pickup apparatus such as a video camera.

However, since a video signal does not include z-data, there is a disadvantage of an incapability of handling the input video signal in the same way as an image signal obtained through normal graphic processing when simply inputting the video signal taken by an image pickup apparatus into a three-dimensional computer graphic system. For example, a video signal has a disadvantage that hidden plane processing etc. cannot be performed.

SUMMARY OF THE INVENTION

The present invention was made in consideration of the above prior art and has as its object providing an image processing apparatus and method capable of performing a variety of graphic processing using a video signal taken by an image pickup apparatus.

To solve the above problems of the prior art and to achieve the above object, the image processing apparatus of the present invention provides a first memory for storing image data for output to a display; a second memory for storing depth data of said image data; an image processing circuit for performing three-dimensional graphic processing of predetermined data to generate a three-dimensional image data including first image data and first depth data corresponding to the first image data; and a write circuit for writing said first image data and said first depth data respectively in said first memory and said second memory as said image data and said depth data and, when second image data corresponding to image pickup data and second depth data corresponding to said second image data are input, writing said second image data and said second depth data respectively to said first memory and said second memory as said image data and said depth data.

In the image processing apparatus of the present invention, when second image data corresponding to image pickup data of, for example, an image pickup apparatus and second depth data corresponding to said second image data are input by a write circuit, said second image data and said second depth data are respectively written to said first memory and said second memory.

Therefore, it becomes possible to handle the second image data stored in the first memory in the same way as the first image data. subjected to normal three-dimensional graphic processing by using the second depth data stored in the second memory in the image processing apparatus.

Further, the image processing apparatus of the present invention preferably has a write circuit which alternately receives as input frame data indicating said second image data and frame data indicating said second depth data, writes the frame data indicating said second image data to said first memory, and writes the frame data indicating said second depth data to said second memory.

Alternatively, the image processing apparatus of the present invention preferably has a write circuit which alternately receives as input line data indicating said second image data and line data indicating said second depth data, writes the line data indicating said second image data to said first memory, and writes the line data indicating said second image data to said second memory.

Alternatively, the image processing apparatus of the present invention preferably has a write circuit which successively receives as input a plurality of data blocks respectively including said second image data and said second depth data for each pixel, writes said second image data included in the input data block to said first memory every time said plurality of data blocks are input, and writes said second depth data to said second memory.

Alternatively, the image processing apparatus of the present invention preferably has a write circuit which receives as input third image data obtained by chroma key composition of said second depth data with said second image data, extracts said second image data from said third image data, writes the extracted image data to said first memory, extracts said-second depth data from said third image data, and writes the extracted depth data to said second memory.

Alternatively, the image processing apparatus of the present invention preferably has a write circuit which directly writes said input second image data and second depth data respectively to said first memory and said second memory.

Alternatively, the image processing apparatus of the present invention preferably has a write circuit which writes said input said second image data and said second depth data to said first memory, reads said second depth data from said first memory, and writes it to said second memory.

Alternatively, the image processing apparatus of the present invention preferably has a write circuit which writes said input said second image data and said second depth data to said second memory and reads said second image data from said second memory and writes it to said first memory.

The image processing method of the present invention includes the steps of performing three-dimensional graphic processing to generate first depth data corresponding to first image data and first depth data corresponding to said image data; writing said first image data and said first depth data in a first memory for storing image data to be output to a display and a second memory for storing depth data of image data stored in said first memory; generating second image data corresponding to image pickup data and second depth data corresponding to said second image data; and writing said second image data and said second depth data respectively to said first memory and said second memory.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

First Embodiment

Below, in the present embodiment, a case will be explained of applying the present invention to a three-dimensional computer graphic system for displaying a desired three-dimensional image of any three dimensional object as a model on a display, such as a CRT (cathode ray tube), at a high speed.

Figure 1:
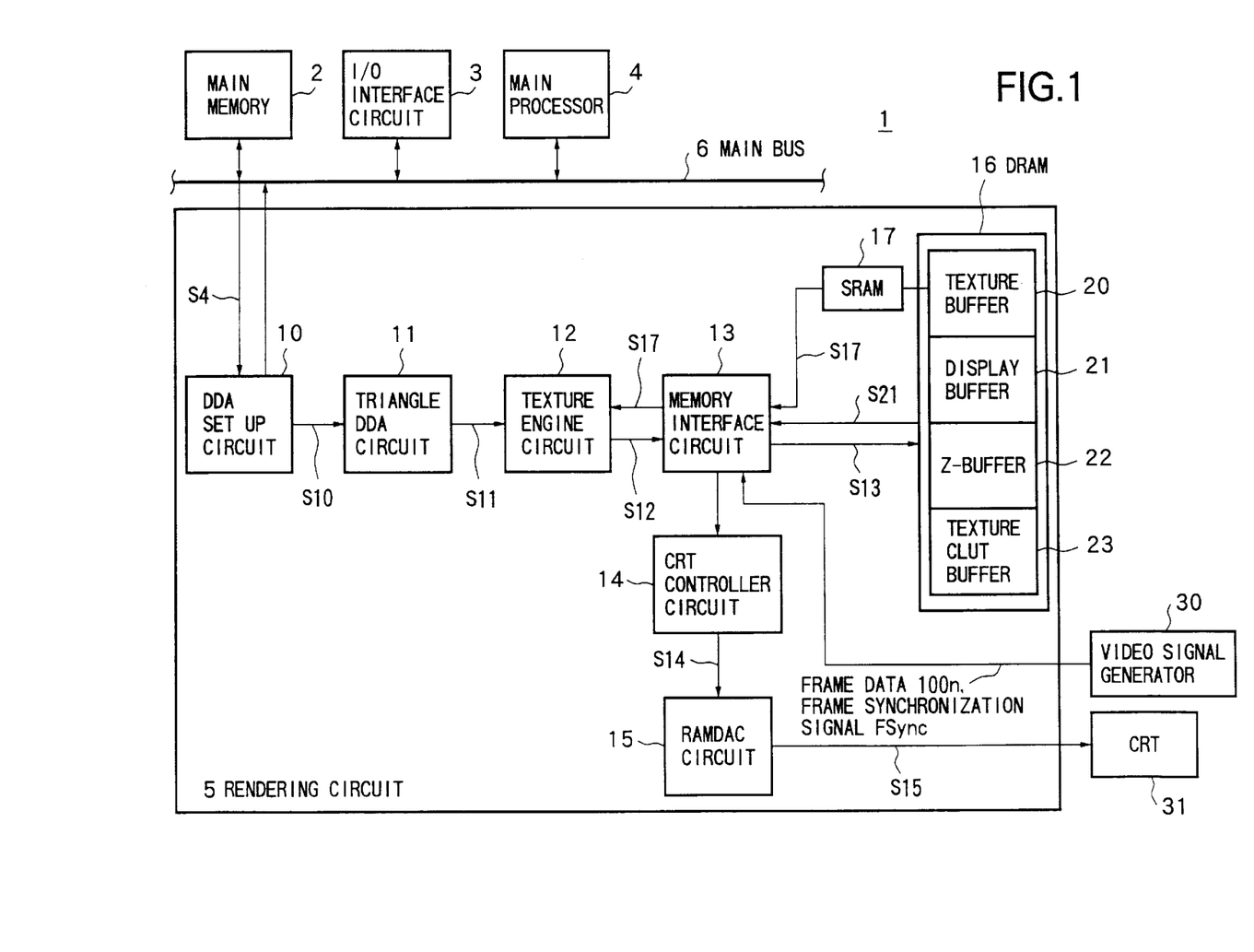
FIG. 1 is a view of the system configuration of a three-dimensional computer graphic system according to a first embodiment of the present invention.

FIG. 1 is a view of the system configuration of a three-dimensional computer graphic system 1 of the present embodiment.

In the three-dimensional computer graphic system 1, a three-dimensional model is expressed by a composite of triangular unit graphics (polygons). By drawing the polygons, this system can decide the color of each pixel on the display screen and perform polygon rendering for display on the screen.

In the three-dimensional computer graphic system 1, a three-dimensional object is expressed by using a z-coordinate for indicating the depth in addition to the (x, y) coordinates for indicating positions on a two-dimensional plane. Any point of the three-dimensional space can be expressed by the three coordinates (x, y, z).

As shown in FIG. 1, in the three-dimensional computer graphic system 1, a main memory 2, an I/O interface circuit 3, a main processor 4, and a rendering circuit 5 are connected via a main bus 6.

Also, the three-dimensional computer graphic system 1 comprises a video signal generation apparatus 30 and a CRT 31.

Below, the operations of the respective components will be explained.

(Main Processor 4)

The main processor 4, for example, in accordance with the execution of a program, generates a control signal to control components inside a rendering circuit 5 and outputs the control signal to the rendering circuit 5 via the main bus 6.

Also, the main processor 4, when executing a predetermined instruction in a program, reads necessary graphic data from the main memory 2, performs clipping, lighting, geometrical processing, etc. on the graphic data and generates polygon rendering data. The main processor 4 outputs the polygon rendering data $S4a$ to the rendering circuit 5 via the main bus 6.

Here, the polygon rendering data includes data of each of the three vertexes (x, y, z, R, G, B, $\alpha$, s, t, q, F) of the polygon.

Here, the (x, y, z) data indicates the three-dimensional coordinates of a vertex of the polygon, and (R, G, B) data indicates the luminance values of red, green, and blue at the three-dimensional coordinates, respectively.

The data $\alpha$ indicates a coefficient of blending the R, G, B data of a pixel to be drawn and that of a pixel already stored in the display buffer 21.

Among the (s, t, q) data, the (s, t) indicates homogeneous coordinates of a corresponding texture and the q indicates the homogeneous term. Here, the texture size USIZE and VSIZE are respectively multiplied with the "s/q" and "t/q" to obtain coordinate data (u, v) of the texture. The texture coordinate data (u, v) is used for accessing the texture data stored in the texture buffer memory 20.

Here, the texture data means data indicating a pattern of the surface of an object to be displayed three-dimensionally.

The F data indicates an $\alpha$ value of fogging.

Namely, the polygon rendering data indicates physical coordinate values of the vertexes of a triangle (unit graphic) and values of colors of the vertexes, texture, and fogging.

(I/O Interface Circuit 3)

An I/O interface circuit 3, in accordance with need, receives as input the polygon rendering data from the outside and outputs the same to the rendering circuits via the main bus 6.

(Video Signal Generating Apparatus 30)

A video signal generating apparatus 30 generates frame data $100_n$ by adding z-data to a video signal of a natural image etc. taken by an image pickup apparatus such as a video camera, where n is an integer of one or more, and outputs the frame data $100_n$ to a memory I/F circuit 13 by synchronizing with a frame (vertical) synchronization signal Fsync.

Figure 2:
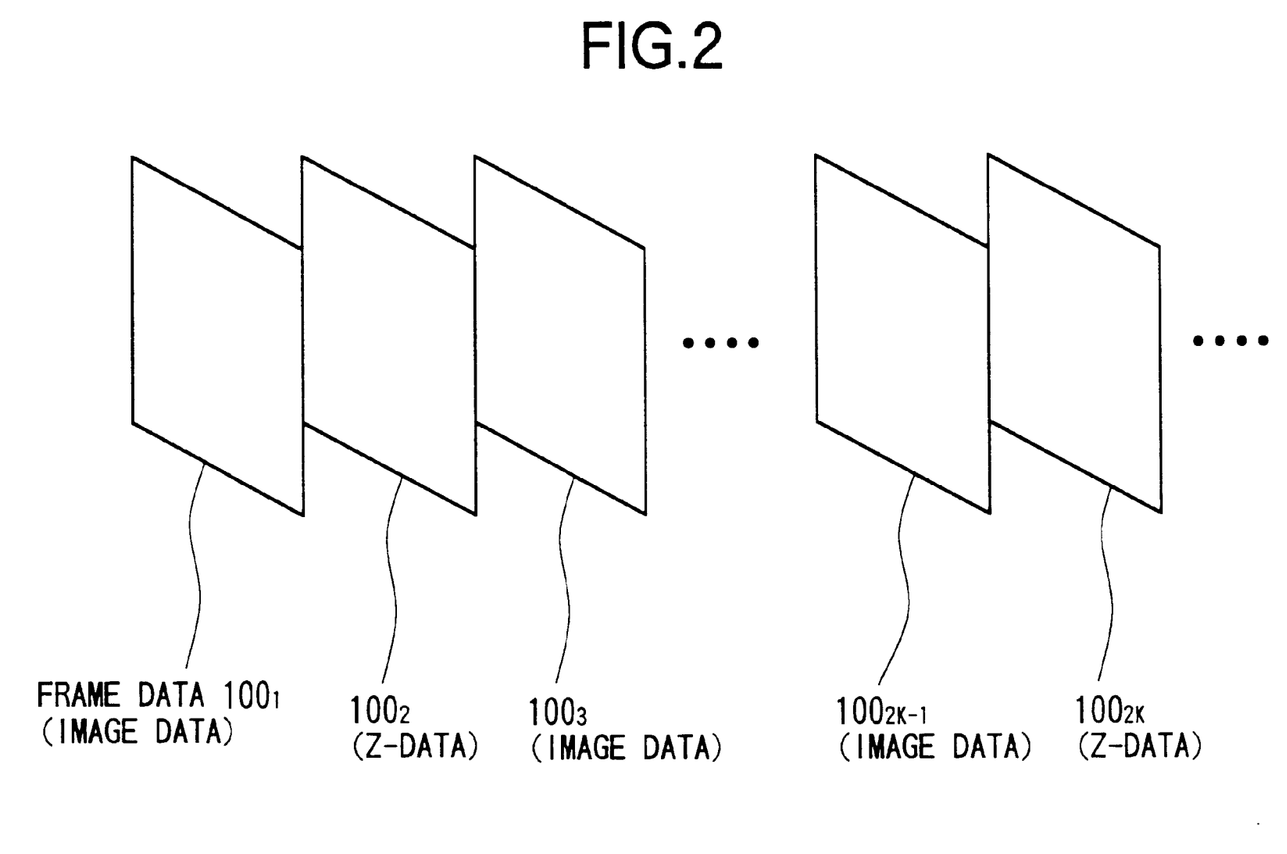
FIG. 2 is a view for explaining frame data output from a video signal generator in the three-dimensional computer graphic system shown in FIG. 1.

Here, as shown in FIG. 2, frame data $100_{2k-1}$ with n as an odd number indicates image data, while frame data $100_{2k}$ with n as an even number indicates z-data (depth data) of the image data indicated by the frame data $100_{2k-1}$.

At this time, for example, by outputting the frame data $100_n$ of 60 frames to the memory I/F circuit 13, a video signal having 30 frames' worth of z-data can be supplied to the rendering circuit 5.

(Rendering Circuit 5)

Below, a rendering circuit 5 will be explained in detail.

As shown in FIG. 1, the rendering circuit 5 comprises a DDA (digital differential analyzer) set up circuit 10, a triangle DDA circuit 11, a texture engine circuit 12 (image processing circuit), a memory I/F circuit 13 (write circuit), a CRT controller circuit 14, a RAMDAC circuit 15, a DRAM 16, and an SRAM 1 which operate based on control signals from the main processor 4.

The DRAM 16 functions as a texture buffer memory 20, a display buffer memory 21 (first memory), a z-buffer memory 22 (second memory), and a texture CLUT buffer memory 23. For example, the frame buffer memory is used for the display buffer memory 21.

(DDA Set Up Circuit 10)

The DDA set-up circuit 10 performs linear interpolation on the values of the vertexes of a triangle in the physical coordinates in a triangle DDA circuit 11 in its latter part. The DDA set-up circuit 10, prior to obtaining information of the color and depth of the respective pixels inside the triangle, performs a set-up operation for obtaining the sides of the triangle and the difference in a horizontal direction for the data (z, R, G, B, α, s, t, q, F) indicated by the polygon rendering data S4a.

Specifically, this set-up operation uses values of the starting point and the ending point and the distance between the two points to calculate the variation of the value to find movement for a unit length.

The DDA set-up circuit 10 outputs the calculated variation data S10 to the triangle DDA circuit 11.

(Triangle DDA Circuit 11)

The triangle DDA circuit 11 uses the variation data input from the DDA set-up circuit 10 to calculate the (z, R, G, B, α, s, t, q, F) data after linear interpolation of each pixel inside the triangle.

The triangle DDA circuit 11 outputs the data (x, y) for each pixel and the (z, R, G, B, α, s, t, q, F) data at the (x, y) coordinates to the texture engine circuit 12 as DDA data (interpolation data) S11.

In the present embodiment, the triangle DDA circuit 11 outputs the DDA data S11 of 8 (=2×4) pixels positioned inside a block being processed in parallel to the texture engine circuit 12.

(Texture Engine Circuit 12)

The texture engine circuit 12 performs the calculation of "s/q" and "t/q", calculation of the texture coordinate data (u, v), reading of the data (R, G, B, α) from the texture buffer memory 20, and α blending (texture α blending) successively in a pipeline format.

Note that the texture engine circuit 12 performs processing on the 8 pixels positioned inside a predetermined block simultaneously in parallel.

The texture engine circuit 12 performs an operation for dividing the data s by the data a and an operation for dividing the data t by the data a on the (s, t, q) data indicated by the DDA data S11.

Also, the texture engine circuit 12 respectively multiplies the texture sizes USIZE and VSIZE with the division results "s/q" and "t/q" to generate the texture coordinate data (u, v).

The texture engine circuit 12 outputs a read request including the generated texture coordinate data (u, v) to the SRAM 17 or DRAM 16 via the memory I/F circuit 13 and obtains the data S17 (R, G, B, α) as texture data read from an address on the SRAM 17 specified by the texture coordinate data (u, v) via the memory I/F circuit 13.

Here, texture data corresponding to a plurality of reducing rates of MIPMAP (textures for a plurality of resolutions) is stored in the texture buffer memory 20 and a copy of the texture data stored in the texture buffer memory 20 is stored in the SRAM 17.

In the present embodiment, by generating the texture coordinates (u, v) in the above way, texture data of a desired reduction rate can be read from the SRAM 17 in units of triangles as unit graphics.

The texture engine circuit 12 generates pixel data S12 by blending the (R, G, B) data in the read data S17 (R, G, B, a) and the (R, G, B) data included in the DDA data S11 from the triangle DDA circuit 11 in the former stage by the ratio indicated by the a data (texture α) included in the data S17 (R, G, B, α).

The texture engine circuit 12 outputs the pixel data S12 to the memory I/F circuit 13.

In the case of a full color mode, the texture engine circuit 12 directly uses the data (R, G, B, α) read from the texture buffer memory 20. In the case of an index color mode, the texture engine circuit 12 reads a color look-up table (CLUT), prepared in advance, from the texture CLUT buffer memory 23, transfers and stores the same in the built-in SRAM, and uses the color look-up table to obtain the data (R, G, B) corresponding to the color index read from the texture buffer memory 20.

(Memory I/F Circuit 13)

A memory I/F circuit 13 outputs display data S21 read from the display buffer memory 21 to the CRT controller circuit 14 when displaying on a CRT 31.

Also, the memory I/F circuit 13 compares the z-data corresponding to the pixel data S12 input from the texture engine circuit 12 with the z-data stored in the z-buffer memory 22 and judges whether the image drawn by the input pixel (image) data S12 is positioned closer to the viewing point than the image stored in the display buffer memory 21. When it is judged that the image drawn by the input pixel data S12 is positioned closer, the memory I/F circuit 13 updates the z-data stored in the z-buffer memory 22 by the z-data corresponding to the pixel data S12 and updates the pixel data in the display buffer memory 21 by the pixel data S12.

Also, the memory I/F circuit 13, in accordance with need, blends the (R, G, B) data included in the image data S12 and the (R, G, B) data already stored in the display buffer memory 21 by the blending ratio indicated by the α data corresponding to the pixel data S12, that is, α blending. Then, the memory I/F circuit 13 writes the data (R, G, B) as display data after blending to the display buffer memory 21.

Note that the DRAM 16 is simultaneously accessed by the memory I/F circuit 13 for 16 pixels' worth of data.

Figure 3:
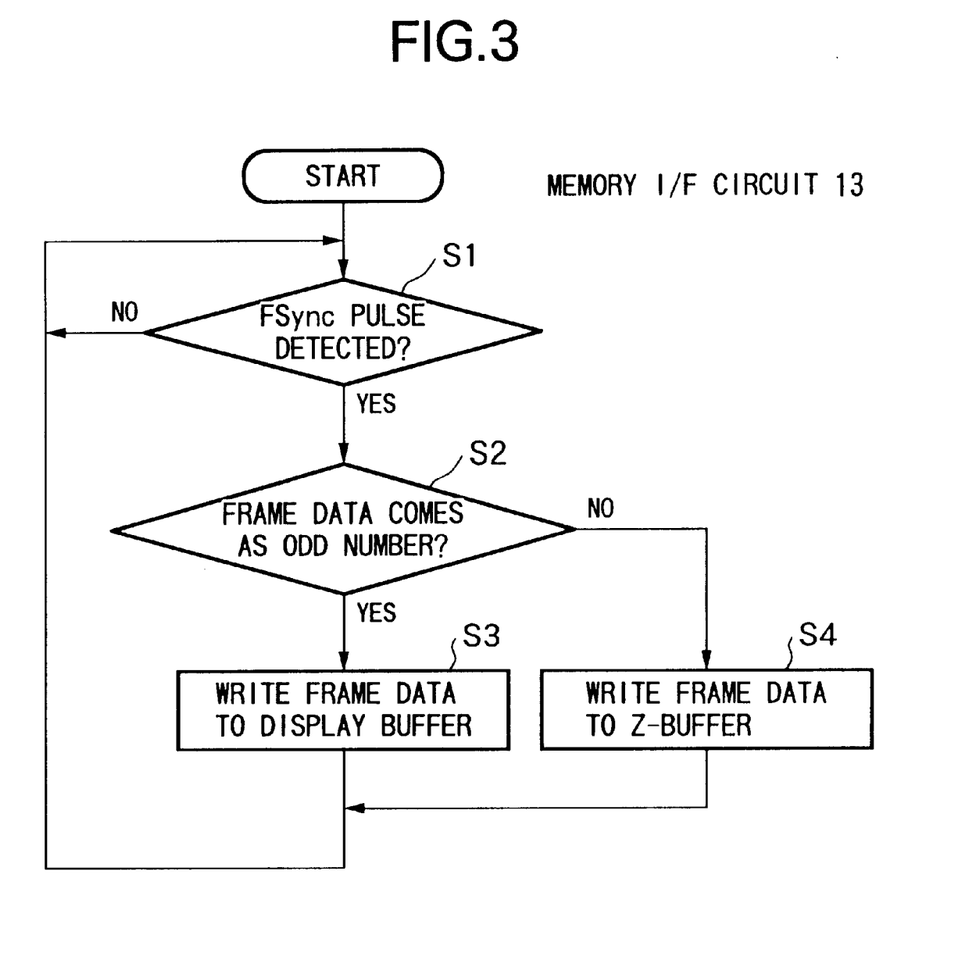
FIG. 3 is a flow chart for explaining processing of a memory I/F circuit shown in FIG. 1.

Also, as shown in FIG. 3, when a pulse included in the frame synchronization signal Fsync input from the video signal generating apparatus 30 is detected, the memory I/F circuit 13 judges whether or not the input frame data $100_n$ comes as an odd number (Step S2). When it is judged to be an odd number, the memory I/F circuit 13 writes frame data $100_{2k-1}$ with n as an odd number indicating image data in the display buffer memory 21 of the DRAM 16 in a data format defined in the memory 21 (Step S3), while when it is judged not to be an odd number, writes frame data $100_{2k}$ with n as an even number indicating z-data in the z-buffer memory 22 in the format defined in the memory 22(Step S4).

As a result, hereinafter, the frame data $100_{2k-1}$ indicating the image data through the normal graphic processing is handled in the same way as the pixel data written in the display buffer memory 21. Namely, the hidden plane processing using the z-data, α blending processing, and chroma key processing are performed on the image data taken from a video signal.

(CRT Controller Circuit 14)

The CRT controller circuit 14 generates an address for display on a not shown CRT 31 and outputs a request for reading the display data stored in the address from the display buffer memory 21 to the memory I/F circuit 13. In response to this request, the memory I/F circuit 13 reads a certain amount of the display data from the display buffer memory 21.

The CRT controller 14 has a built-in FIFO (first-in first-out) circuit for storing the display data read from the display buffer memory 21 and outputs the stored display data by reading at certain time intervals to the RAMDAC circuit 15 as display data S14a.

(DRAM 16)

A DRAM 16 comprises a texture buffer memory 20, display buffer memory 21, z-buffer memory 22, and texture CLUT buffer memory 23.

Here, the texture buffer memory 20 stores texture data corresponding to a plurality of reduction rates such as MIPMAP (textures for a plurality of resolutions) as explained above.

The display buffer memory 21 stores display data indicating R, G, and B values of each pixel in a predetermined data format. Also, the display buffer memory 21 stores, as explained above, the frame data $100_{2k-1}$ indicating image data input from the video signal generator 30 via the memory I/F circuit 13.

The z-buffer memory 22 stores z-data of each pixel in a predetermined data format. Also, the z-buffer memory 22 stores, as explained above, the frame data $100_{2k}$ indicating z-data input from the video signal generator 30 via the memory I/F circuit 13.

The texture CLUT buffer memory 23 stores a color look-up table (CLUT).

(RAMDAC Circuit 15)

The RAMDAC circuit 15 stores the R, G. B data corresponding to the respective index values, transfers the display data S14 input from the CRT controller 14 to the D/A converter, and generates RGB data in an analog form. The RAMDAC circuit 15 outputs the generated R, G, B data S15 to the CRT 31.

Below, an example of the operation bf the three-dimensional computer graphic system i will be explained.

In the three-dimensional computer graphic system 1, the frame data $100_{2k-1}$ indicating image data and the frame data $100_{2k}$ indicating z-data of the image data indicated by the frame data $100_{2k-1}$ are generated in the video signal generator 30 and output to the memory I/F circuit 13 in synchronization with the frame synchronization signal Fsync.

Next, in the memory I/F circuit 13, as shown in FIG. 3, when the pulse included in the frame synchronization signal Fsync input from the video signal generator 30 is detected (Step S1), it is judged whether or not the input frame data $100_n$ is an odd number (Step S2). When it is judged to be an odd number, the frame data $100_{2k-1}$ with n as an odd number indicating the image data is written to the display buffer memory 21 of the DRAM 16 (Step S3), while when it is judged to not be an odd number, the frame data $100_{2k}$ with n as an even number indicating z-data is written to the z buffer memory 22 (Step S4).

As a result, hereinafter, the frame data $100_{2k-1}$ indicating image data obtained by a video signal is handled in the same way as the image data written in the display buffer memory 21 after being subjected to the normal graphic processing. Namely, the hidden plane processing using the z-data, a blending, and chroma key processing are performed on the image data taken from a video signal.

Also, for example, polygon rendering data S4a is output from the main processor 4 to the DDA set-up circuit 10 via the main bus 6. Variation data S10 indicating the difference between the sides of the triangle and the horizontal direction etc. is generated in the DDA set-up circuit 10.

This variation data S10 is output to the triangle DDA circuit 11. In the triangle DDA circuit 11, the linearly interpolated data (z, R, G, B, α, s, t, q, F) for each pixel inside the triangle is calculated. Then, the calculated (z, R, G, B, α, s, t, q, F) data and the (x, y) data of the vertexes of the triangle are output from the triangle DDA circuit 11 to the texture engine circuit 12 as DDA data S11.

Next, the texture engine circuit 12 performs an operation for dividing the data s by the data q and an operation for dividing the data t by data q for the data (s, t, q) indicated by the DDA data S11.

At this time, the division "s/q" and "t/q" are simultaneously carried out for 8 pixels by eight division circuits. Then, the texture sizes USIZE and VSIZE are respectively multiplied with the division results "s/q" and "t/q" to generate the texture coordinate data (u, v).

Next, a request for reading including the above generated texture coordinate data (u, v) is output from the texture engine circuit 12 to the SRAM 17 via the memory I/F circuit 13. Then, the texture data S17 (R, G, B, α) stored in the SRAM 17 is read via the memory I/F circuit 13.

Next, in the texture engine circuit 12, the data (R, G, B) in the read data S17 (R, G, B, α) and the (R, G, B) data included in the DDA data S11 from the triangle DDA circuit 11 in the former stage are blended by the ratio indicated by the α data (texture α) included in the data S17 (R, G, B, α) to generate the pixel data S12.

This pixel data S12 is output from the texture engine circuit 12 to the main memory I/F circuit 13.

Then, in the memory I/F circuit 13, the z-data corresponding to the pixel data S12 input from the texture engine circuit 12 and the z-data (for example, the z-data indicated by the frame data $100_{2k}$) stored in the z-buffer-memory 22 are compared. When the image drawn by the input pixel data S12 is judged to be positioned closer to the viewing point than the image corresponding to the image data indicated by the frame data $100_{2k-1}$ stored in the display buffer memory 21 the previous time, the z-data stored in the z-buffer memory 22 is updated by the z-data corresponding to the image data S12.

Next, in the memory I/F circuit 13, in accordance with need, the (R, G, B) data included in the image data S12 and the (R, G, B) data indicated by the frame data $100_{2k-1}$ already stored in the display buffer memory 21 are blended by the ratio indicated by the α data (α data included in the DDA data S11) corresponding to the pixel data S12. Then, the blended data (R, G, B) is written to the display buffer 21 as display data.

Then, the (R, G, B) data stored in the display buffer memory 21 is read as display data S21 by the memory I/F circuit 13 and output to the CRT controller circuit 14.

Then, after the display data S21 is adjusted in timing in the CRT controller circuit 14, it is output to the RAMDAC circuit 15 as display data S14.

Then, the display data S14 is converted to R, G, B data S15 in the RAMDAC circuit 15 and the R, G, B data S15 is output to the CRT 31.

Second Embodiment

The present embodiment is basically the same as the three-dimensional computer graphic system 1 shown in FIG. 1 of the first embodiment except for the point that the functions of the memory I/F circuit 13 and the video signal generator shown in FIG. 1 are different.

Figure 4:
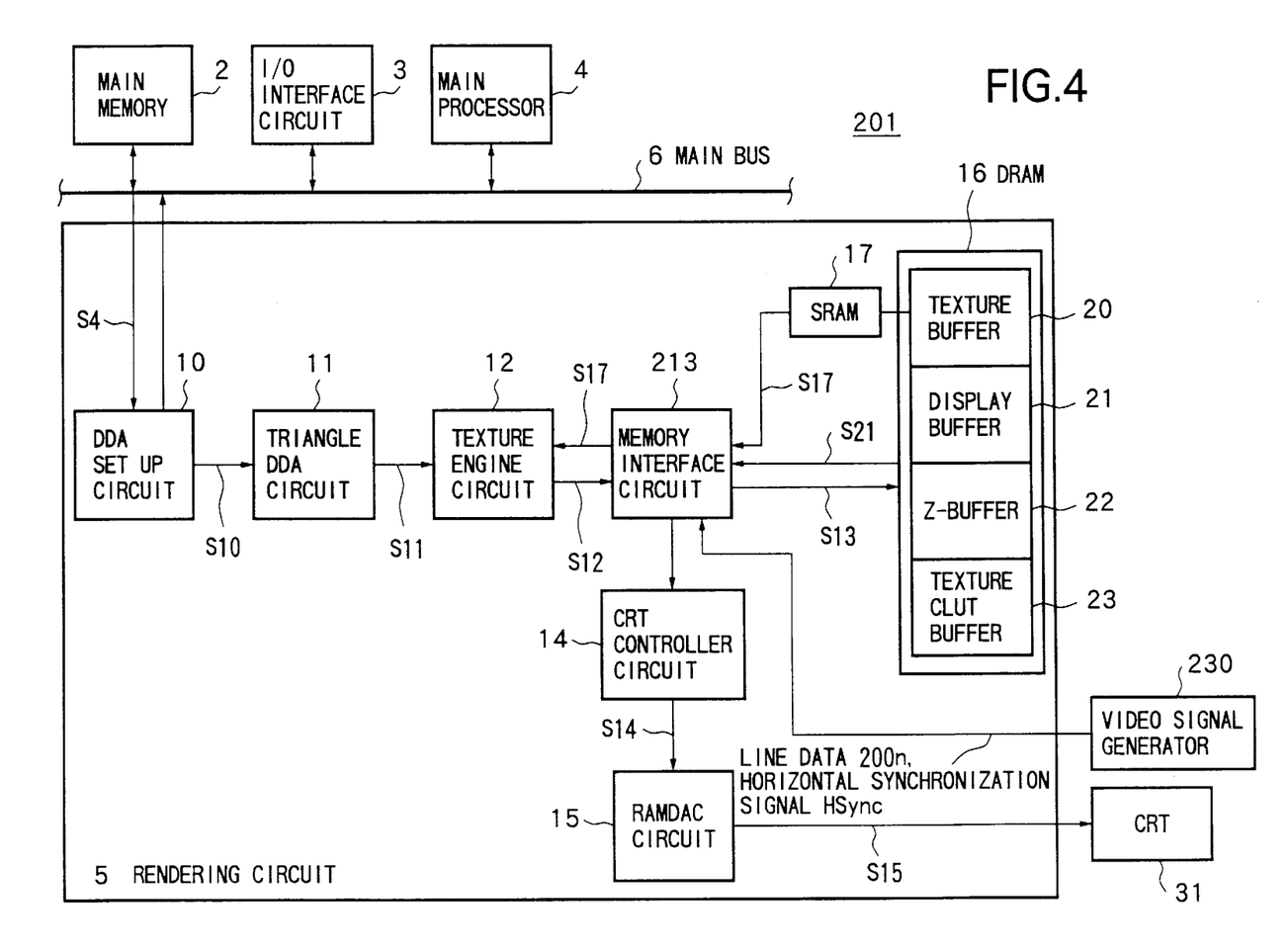
FIG. 4 is a system configuration of a three-dimensional computer graphic system according to a second embodiment of the present invention.

FIG. 4 is a view of the system configuration of a three-dimensional computer graphic system 201 of the present embodiment.

In FIG. 4, components having the same reference numbers are the same as those explained in the first embodiment.

Namely, in the three-dimensional computer graphic system 201, a memory I/F circuit 213 and the video signal generator 230 are different from the corresponding components in the above first embodiment.

Figure 5A:
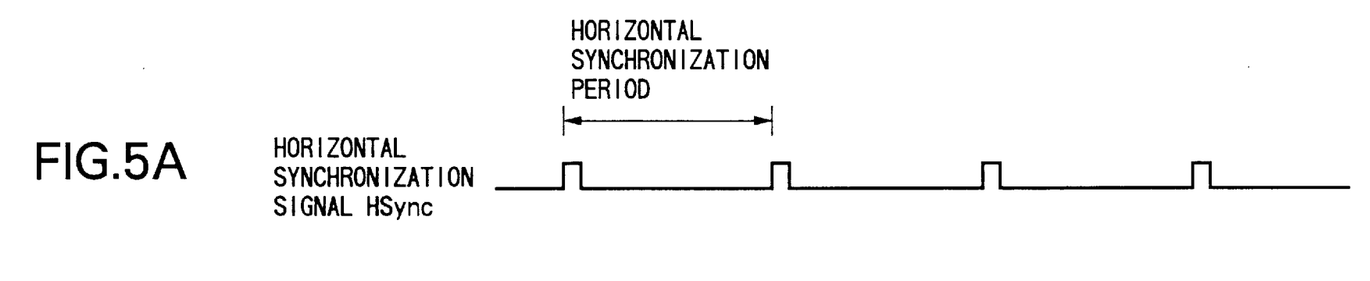
FIG. 5A and FIG. 5B are views for explaining line data output from a video signal generator in the three-dimensional computer graphic system shown in FIG. 4.
Figure 5B:
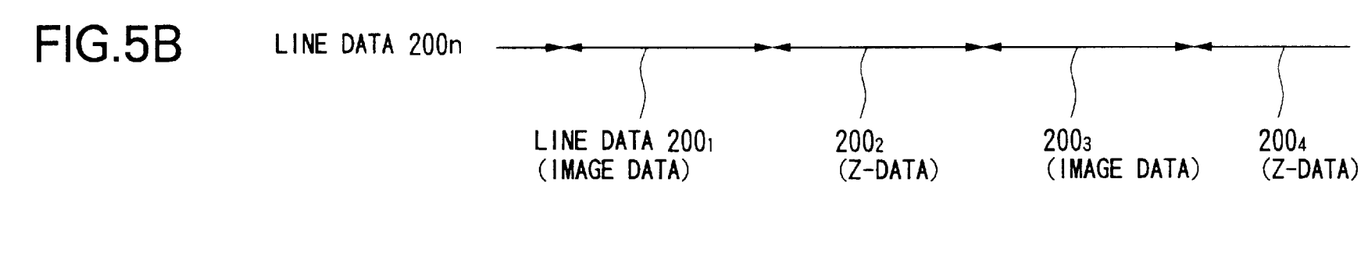

The video signal generator 230 generates line data $200_n$ by adding z-data to an image signal obtained from an image pickup apparatus such as a video camera, where n is an integer of 1 or more, and outputs the line data $200_n$ to the memory I/F circuit 13 in synchronization with a horizontal synchronization signal Hsync as shown in FIGS. 5(A) and (B).

Here, as shown in FIG. 5, the line data $200_{2k-1}$ with n as an odd number indicates image data and the line data $200_{2k}$ with n as an even number indicates z-data of image data indicated by the line data $200_{2k-1}$.

Namely, the video signal generator 230 outputs image data and z-data corresponding to the image data alternately in every horizontal synchronization period to the memory I/F circuit 213.

Figure 6:
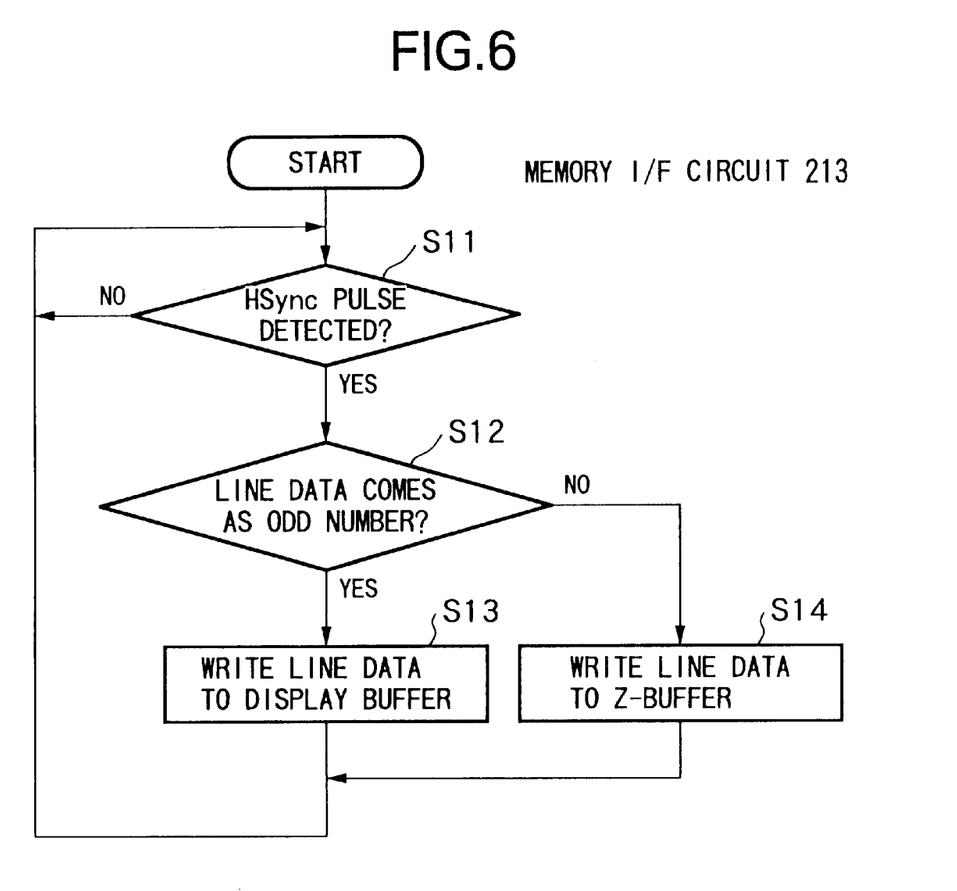
FIG. 6 is a flow chart for explaining processing of the memory I/F circuit shown in FIG. 4.

Also, as shown in FIG. 6, when a pulse included in the horizontal synchronization signal Hsync input from the video signal generator 30 is detected (Step S11), the memory I/F circuit 213 judges whether the input line data $200_n$ is an odd number (Step S12). When judged an odd number, the line data $200_{2k-1}$ with n as an odd number indicating image data is written to the display buffer memory 21 of the DRAM 16 (Step S13), while when judged not an odd number, the line data $200_{2k}$ with n as an even number indicating z-data is written to the z-buffer memory 22 (Step S14).

Also in the present embodiment, in the same way as in the above first embodiment, the line data $200_{2k-1}$ indicating image data obtained from a video signal is handled in the same way as the image data subjected to normal graphic processing and written in the display buffer memory 21. Namely, the hidden plane processing using the z-data, α blending, and chroma key processing are performed on the image data taken from a video signal.

Third Embodiment

The present embodiment is basically the same as the three-dimensional computer graphic system 1 shown in FIG. 1 of the first embodiment except for the point that the functions of the memory I/F circuit 13 and the video signal generator shown in FIG. 1 are different.

Figure 7:
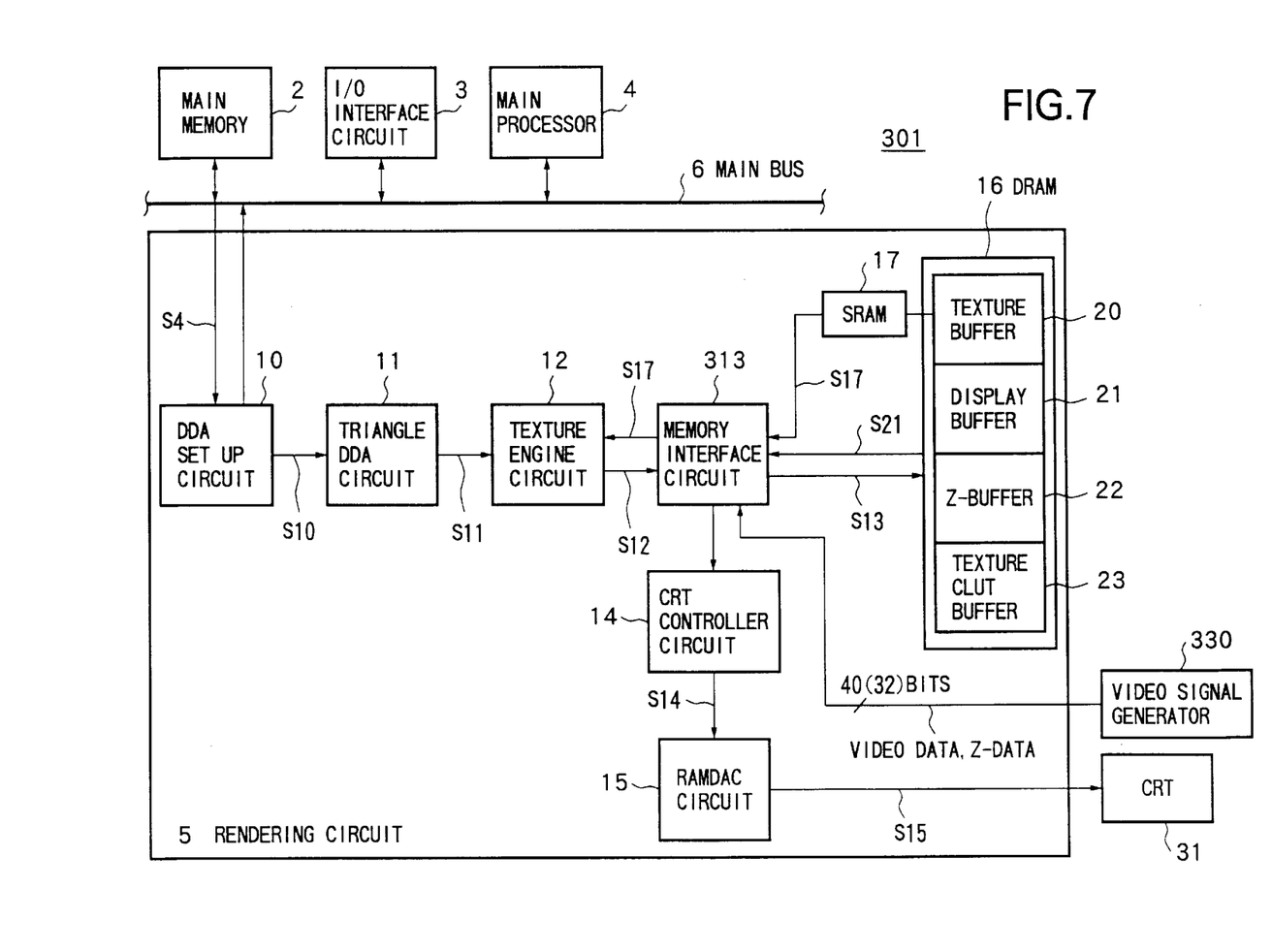
FIG. 7 is a view of the system configuration of a three-dimensional computer graphic system according to a third embodiment of the present invention.

FIG. 7 is a view of the system configuration of a three-dimensional computer graphic system 301 of the present embodiment.

In FIG. 7, components having the same reference numbers are the same as those explained in the first embodiment.

Namely, in the three-dimensional computer graphic system 301, a memory I/F circuit 313 and the video signal generator 330 are different from the corresponding components in the above first embodiment.

The video signal generator 330 is, for example, generates a plurality of data blocks including image data obtained from a video signal obtained from an image pickup apparatus such as a video camera and z-data for each pixel, and simultaneously outputs data comprising the data block to the memory I/F circuit 313.

Figure 8:
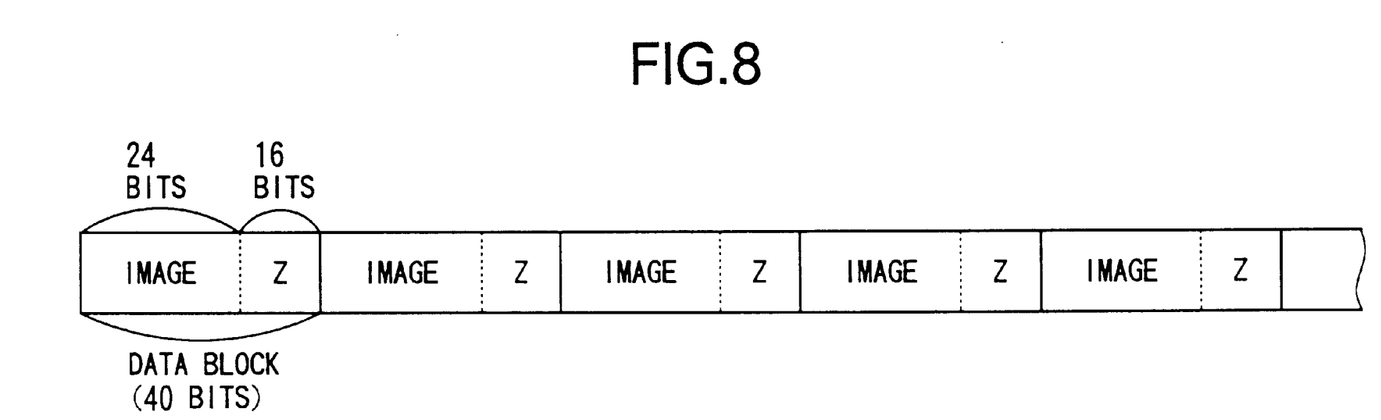
FIG. 8 is a view for explaining image data and z-data output from a video signal generator in the three-dimensional computer graphic system shown in FIG. 7.

At this time, as shown in FIG. 8, the upper 24 bits in a 40-bit data block stores image data and the lower 16 bits stores z-data corresponding to the image data.

Also, the memory I/F circuit 313 writes the image data stored in the upper 24 bits of the data block to the display buffer memory 21 of the DRAM 16 and writes the z-data stored in the lower 16 bits to the z-buffer memory 22 for every data block input from the video signal generator 330.

Also, by the present embodiment, in the same way as in the above first embodiment, the image data obtained from a video signal is handled in the same way as the image data subjected to normal graphic processing and written in the display buffer memory 21. Namely, the hidden plane processing using the z-data, α blending, and chroma key processing are performed on the image data taken from a video signal.

Figure 9:
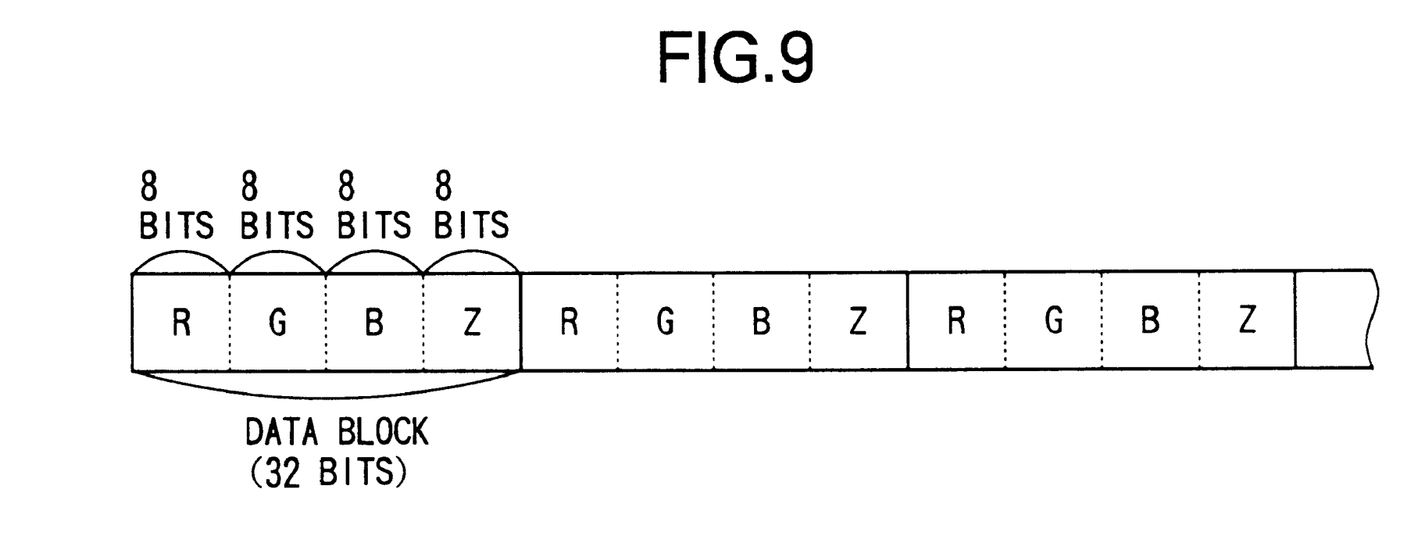
FIG. 9 is a view for explaining another example of image data and z-data output from the video signal generator in the three-dimensional computer graphic system shown in FIG. 7.

Note that, for example as shown in FIG. 9, a 32-bit data block comprised by R, G, B data each of which is 8 bits and z-data may be output from the video signal generator 330 to the memory I/F circuit 313.

By doing so, as shown in FIG. 7, it becomes possible to make the data format of the R, G, B data match between the 8-bit image data S12 comprised by R, G, B, α data and the block data input from the video signal generator 330, therefore processing on the R, G, B data can be made common between a case of inputting the image data S12 and the case of inputting the block data.

Also, as an example of a modification, in the present invention, for example, the video signal generator may generate image data including z-data by chroma-key composition of z-data with the image data obtained from a video signal using predetermined color data, the predetermined color data may be extracted from the image data input from the video signal generator to obtain z-data, for example, in the memory I/F circuit, the z-data may be written in the z-buffer memory 22, and the image data after removal of the z-data may be written in the display buffer memory 21 based on the results of z-comparison.

Fourth Embodiment

The three-dimensional computer graphic system of the present embodiment has the same configuration as the above explained three-dimensional computer graphic system 1 shown in FIG. 1, however, part of the processing of the memory I/F circuit 13 is different from that of the first embodiment.

Namely, in the above first embodiment, the memory I/F circuit 13 wrote odd number frame data $100_{2k-1}$ to the display buffer memory 21 of the DRAM 16 and wrote even number frame data $100_{2k}$ to the z-buffer memory 22 in the frame data $100_n$ input from the video signal generator 30 as explained by referring to FIG. 3.

Figure 10:
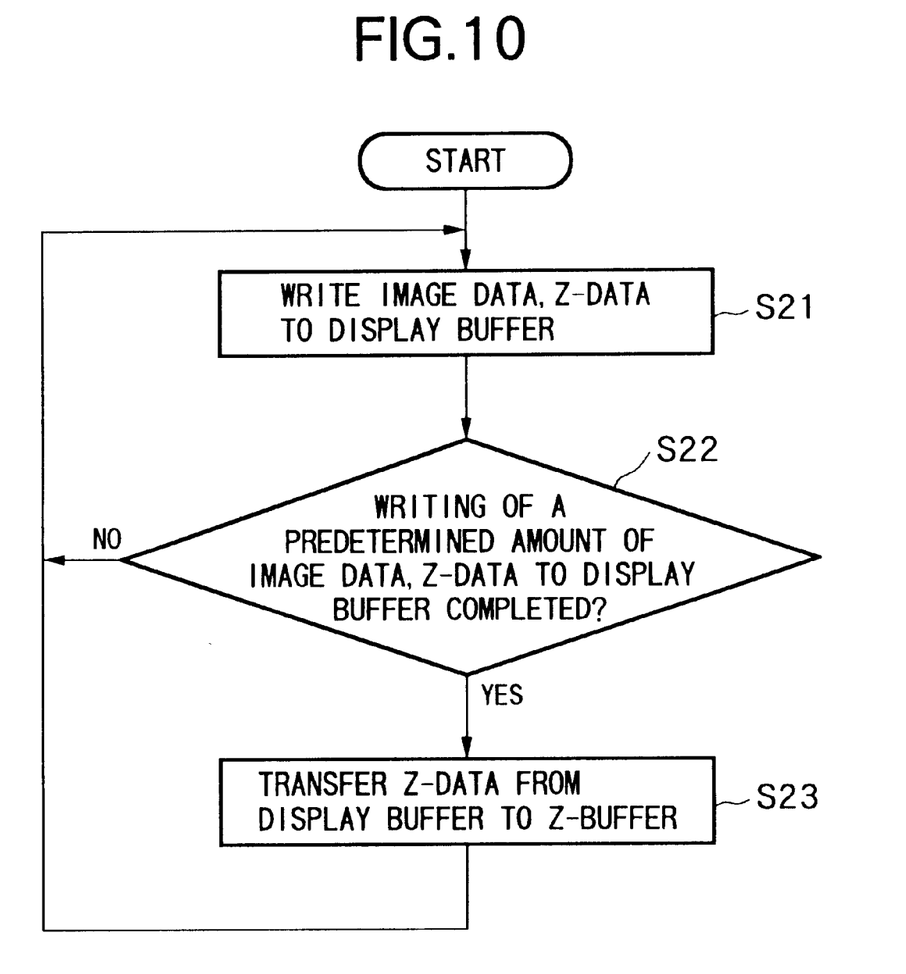
FIG. 10 is a flow chart for explaining processing of the memory I/F circuit shown in FIG. 1 in the three-dimensional computer graphic system according to a fourth embodiment of the present invention.

FIG. 10 is a flow chart for explaining the processing of the memory I/F circuit 13 in the three-dimensional computer graphic system of the present embodiment.

On the other hand, as shown in FIG. 10, in the present embodiment, the memory I/F circuit 13 temporarily writes all of the frame data $100_n$ input from the video signal generator 30 to the display buffer memory 21 of the DRAM 16 in a format defined by the memory 21 (Step S21) and, after writing a predetermined amount of frame data $100_n$ to the display buffer memory 21 (Step S22), performs control to transfer and store even number frame data $100_{2k}$ in the written frame data $100_n$ to the z-buffer memory by transfer between buffers in a format defined by the memory 22 (Step S23).

In the present embodiment, by performing control in the memory I/F circuit 13 in the above way, the frame data $100_{2k}$ indicating z-data can no longer be written in the z-buffer memory 22 in real time. However, in the memory I/F circuit 13, it is not necessary to distribute the frame data $100_n$ input from the video signal generator 30 to the display buffer memory 21 and the z-buffer memory 22 and so the processing load on the memory I/F circuit 13 can be reduced.

Note that in the present invention, for example, the memory I/F circuit 13 temporarily writes all of the frame data $100_n$ input from the video signal generator 30 in the z-buffer memory of the DRAM 16 in a format defined by the memory 22 and, after writing a predetermined amount of frame data $100_n$ in the z-buffer-memory 22, may perform control to transfer and store the odd number frame data $100_{2k-1}$ in the written frame data loon in the display buffer memory 21 by transfer between buffers in the format defined by the memory 21.

The present invention is not limited to the above embodiments.

For example, image data and z-data read from the DRAM 16 of another three-dimensional computer graphic system having the same configuration as FIG. 1 may be input to the memory I/F circuit 13 of the above three-dimensional computer graphic system 1 shown in FIG. 1 and may be written in the display buffer 21 and the z-buffer 22.

Also, in the above embodiment, the configuration of using an SRAM 17 was shown as an example, however, it may be configured not to have the SRAM 17.

Also, the texture buffer memory 20 and the texture CLUT buffer memory 23 shown in FIG. 1 may be provided outside of the DRAM 16.

Furthermore, in the three-dimensional computer graphic system 1 shown in FIG. 7, a case where the geometrical processing for generating polygon rendering data was performed in the main processor 4 was shown as an example, however, the system may be configured to perform the same in the rendering circuit 5.

As explained above, according to the image processing apparatus and method of the present invention, it is possible to perform a variety of graphic processing by using image data (video signal) obtained by an image pickup apparatus.

While the invention has been described with reference to specific embodiment chosen for purpose of illustration, it should be apparent that numerous modifications could be made thereto by those skilled in the art without departing from the basic concept and scope of the invention.

What is claimed is:

1. An image processing apparatus comprising:
   a first memory for storing image data for output to a display;
   a second memory for storing depth data of said image data;
   an image processing circuit for performing three-dimensional graphic processing of predetermined data to generate a three-dimensional image data including first image data and first depth data corresponding to the first image data; and
   a write circuit for writing said first image data and said first depth data respectively in said first memory and said second memory as said image data and said depth data and, when second image data corresponding to image pickup-data and second depth data corresponding to said second image data are input, writing said second image data and said second depth data respectively to said first memory and said second memory as said image data and said depth data.

2. An image processing apparatus as set forth in claim 1, wherein said write circuit alternately receives as input frame data indicating said second image data and frame data indicating said second depth data, writes the frame data indicating said second image data to said first memory, and writes the frame data indicating said second depth data to said second memory.

3. An image processing apparatus as set forth in claim 1, wherein said write circuit alternately receives as input line data indicating said second image data and line data indicating said second depth data, writes the line data indicating said second image data to said first memory, and writes the line data indicating said second image data to said second memory.

4. An image processing apparatus as set forth in claim 1, wherein said write circuit successively receives as input a plurality of data blocks respectively including said second image data and said second depth data for each pixel, writes said second image data included in the input data block to said first memory every time said plurality of data blocks are input, and writes said second depth data to said second memory.

5. An image processing apparatus as set forth in claim 1, wherein said write circuit receives as input third image data obtained by chroma key composition of said second depth data with said second image data, extracts said second image data from said third image data, writes the extracted image data to said first memory, extracts said second depth data from said third image data, and writes the extracted depth data to said second memory.

6. An image processing apparatus as set forth in claim 1, wherein said write circuit directly writes said input second image data and second depth-data respectively to said first memory and said second memory.

7. An image processing apparatus as set forth in claim 1, wherein said write circuit writes said input said second image data and said second depth data to said first memory, reads said second depth data from said first memory, and writes it to said second memory.

8. An image processing apparatus as set forth in claim 1, wherein said write circuit writes said input said second image data and said second depth data to said second memory and reads said second image data from said second memory and writes it to said first memory.

9. An image processing apparatus as set forth in claim 1, wherein said first memory and said second memory are separated in a single semiconductor device.

10. An image processing apparatus as set forth in claim 1, wherein said image processing circuit performs hidden plane processing by using said depth data stored in said second memory.

11. An image processing method comprising the steps of:
- performing three-dimensional graphic processing to generate first image data and first depth data corresponding to said first image data;
- writing said first image data and said first depth data in a first memory for storing-image data to be output to a display and a second memory for storing depth data of image data stored in said first memory respectively;
- generating second image data corresponding to image pickup data and second depth data corresponding to said second image data; and
- writing said second image data and said second depth data respectively to said first memory and said second memory.

12. An image processing method as set forth in claim 11, comprising the steps of:
- generating frame data indicating said second image data and frame data indicating said second depth data; and
- alternately performing writing to said first memory of the frame data indicating said second image data and writing to said second memory of the frame data indicating said second depth data.

13. An image processing method as set forth in claim 11, comprising the steps of:
- generating line data indicating said second image data and line data indicating said second depth data; and
- alternately performing for every horizontal synchronization period writing to said first memory of the line data indicating said second image data and writing to said second memory of the line data indicating said second depth data.

14. An image processing method as set forth in claim 11, comprising the steps of:
- successively generating a plurality of data blocks respectively including said second image data and said second depth data for each pixel; and
- writing said second image data included in said data block to said first memory and writing said second depth data to said second memory.

15. An image processing method as set forth in claim 11, comprising the steps of:
- generating third image data obtained by chroma key composition of said second depth data with said second image data, extracting said second image data from said third image data, and writing the extracted image data to said first memory, and
- extracting said second depth data from said third image data and writing the extracted depth data to said second memory.

16. An image processing method as set forth in claim 11, comprising the steps of directly writing said generated second image data and second depth data respectively to said first memory and said second memory.

17. An image processing method as set forth in claim 11, comprising the steps of writing said generated second image data and second depth data to said first memory and reading said second depth data from said first memory and writing it to said second memory.

18. An image processing method as set forth in claim 11, comprising the steps of writing said generated second image data and second depth data to said second memory and reading said second image data from said second memory and writing it to said first memory.

19. An image processing method as set forth in claim 11, comprising the step of performing hidden plane processing by using said depth data stored in said second memory.

* * * * *